3,152,098
COLORED POLYCARBONATE RESIN
COMPOSITIONS
Robert H. Snedeker, New Brunswick, N.J., assignor to Union Carbide Corporation, a corporation of New York
No Drawing. Filed Aug. 31, 1960, Ser. No. 53,043
9 Claims. (Cl. 260—37)

The present invention relates in general to polycarbonate resin compositions, and more particularly to colored polycarbonate resin compositions which possess excellent color stability at high temperatures.

Polycarbonate resins have been colored heretofore with a variety of organic dyestuffs. In the main the color has been imparted to films, filaments, tapes, fibers and analogous products by the technique known as dip dyeing in which the preformed article is immersed in a dye solution at moderate temperatures, i.e., of the order of 130° C. This procedure is time consuming, difficult to reproduce, and results in colored articles which cannot be subjected to the high temperatures at which polycarbonates are uniquely stable without suffering severe color deterioration.

It is therefore the general object of the present invention to provide colored polycarbonate resins which can withstand temperatures as high as 650–700° F. without fading or otherwise undergoing color change.

It is a more particular object to provide colored polycarbonate compositions which can be prepared in bulk prior to being fabricated into consumer articles.

These and other more particular objects which will be obvious from the specification hereinafter are accomplished by the compositions of this invention which comprise a normally solid polycarbonate resin and an amount of an anthraquinone type organic dye sufficient to impart the intensity of color desired.

The organic dyes found to be suitably employed in the practice of the present invention are members of the group consisting of 1-methylamino anthraquinone; 1-butylamino anthraquinone; 1-hydroxy-4-ethylamino anthraquinone; 1,4 di(p-toluidino) anthraquinone; and 1,5 di-(p-toluidino) anthraquinone. Each of these suitable dyes are well known compounds are are commercially available. Surprisingly, it has been found that these particular dyes procide transparent colored polycarbonates with a high degree of permanency and uniformity despite the the fact that other anthraquinone dyes of quite similar structure, even homologues, are totally unsuitable for this purpose. For example, 1-methylamino-1,4-dihydroxy anthraquinone; 4-(p-toluidino)1,4 dihydroxy anthraquinone; and 1,4 diethylamino anthraquinone were found to exhibit behavior as colorants in polycarbonates ranging from severe fading to severe darkening in color when subjected to temperatures of 650° F.

The polycarbonate resins which are suitably employed in the practice of the present invention are any of the polycarbonate homopolymers, copolymers and copolyesters well known in the art. Detailed descriptions of the polymers and the processes of producing them initially are contained in Angew. Chem. 68, No. 20, pp. 633–640 (1956), H. Schnell; British Patent 772,627, issued April 17, 1957, to Farbenfabriken Bayer AG as assignee; French Patent 1,215,629, General Electric Co., U.S.A., as assignee; and Italian Patent 559,322, granted March 16, 1957. In general, polycarbonate homopolymers and copolymers are produced either by direct phosgenation of a bisphenol or mixture of bisphenols in the presence of an acid binding agent, or by ester interchange reaction between a bisphenol or mixture of bisphenols and a carbonate ester such as diphenyl carbonate. Copolyesters are prepared by employing, usually in minor proportion with respect to the bisphenol, a monohydroxy monocarboxylic acid, a dicarboxylic acid, or suitable derivatives thereof such as phthaloyl chloride. Illustrative of the well known polycarbonate homopolymers and copolymers which can suitably be employed are those which comprise recurring units corresponding to the formula

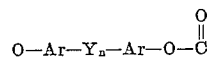

wherein Ar in each occurrence is an aromatic nucleus such as a phenylene radical, Y is a divalent organic radical such as alkylene, alkylidene, a cycloaliphatic group, an aryl group, a sulfur-containing linkage, such as sulfide or sulfone, an ether linkage, a carbonyl group, two or more aryl or aliphatic groups connected by an ether linkage, a carbonyl linkage, and the like and $n$ has a value of 0 or 1. Particularly preferred polycarbonate homopolymers and copolymers are those in which Y is an alkylidene group containing from 1 to 6 carbon atoms and Ar is a para-phenylene radical.

The copolyesters suitably employed are also well known and include polymers comprising at least two of the following four recurring units

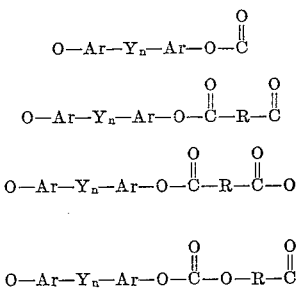

and wherein Ar, Y and $n$ have the same meaning as in the general formula for the polycarbonate homopolymers and copolymers above, and wherein R is the alkylene, alkylidene, cycloaliphatic, aryl, aralkyl or alkaryl group and the like. Preferably, Y is an alkylidene group containing from 1 to 6 carbon atoms and Ar and R are each a phenylene radical.

Incorporation of the organic dye into the polycarbonate resin can be readily accomplished by conventional compounding techniques and is not at all critical. For example pelletized polycarbonate resin and the desired organic dye can be tumbled together to attain an initial dispersion and thereafter charged to a conventional screw type extruder in which the resin is fluxed and sheared to achieve complete and uniform dispersion of the colorant. Sufficient dispersion can also be obtained by fluxing and sheeting the composition of resin and colorant on a two-roll mill.

The quantity of organic dye employed is not at all critical and can be present in the final colored combination in amounts commensurate with the desired intensity of the color. It has been found that amounts as small as 0.000001 percent up to 2.0 percent by weight based on the weight of the polycarbonate resin impart a substantial and pleasing color or tint to the overall composition which can easily be reproduced in successive batches. Preferably the quantity of organic dye is from about 0.001 to about 1.0 percent by weight based on the weight of the polycarbonate resin.

The colored compositions can also include fillers, stabilizers, plasticizers, antioxidants and the like without departing from the scope of the present invention. Various shades and tints can also be achieved by employing mixtures of two or more of the organic dyes included within the scope of this invention. Similarly mixtures of two or more different polycarbonate resins can be employed if desired.

The following examples are provided in order that the practice of this invention can be better understood. The examples are illustrative only, and are not intended to be in any way limitative. Unless otherwise specified, reduced viscosity values are given for a solution of 0.2 gram of the polymer mass in 100 ml. of methylene chloride solution at 25° C.

EXAMPLE 1

*Preparation of a High Molecular Weight Poly-carbonate Homopolymer*

To a two liter glass reactor equipped with a sealed stirrer, thermometer, gas inlet, reflux condenser, pH electrodes and a dropping funnel was charged:

| | Gms. |
|---|---|
| 2,2–(4,4′ dihydroxy diphenyl)propane (Bisphenol A) | 125 |
| p-Phenyl phenol | 2.83 |
| Methylene chloride | 550 |
| Sodium hydrosulfite | 0.11 |
| Triethylamine | 1.67 |
| Aqueous sodium hydroxide solution (8.8% NaOH) | 230 |

An additional 418 grams of sodium hydroxide solution (8.8% by weight NaOH) were placed in the dropping funnel. Phosgene gas (70 grams) was bubbled into the reaction over a period of one hour and forty minutes at 25° C.±2° C. Concurrently, the sodium hydroxide in the dropping funnel was added so as to maintain a pH of 10.5–11.2. After all the sodium hydroxide had been added, phosgenation was continued to a pH of 7. The reaction mass was then stirred for ten minutes with 25 grams of NaOH dissolved in 50 grams of water. The agitator was stopped and the two layers were allowed to separate. The aqueous layer was decented off (no unreacted bisphenol was found on acidification of this portion), and the solvent-polymer solution was then acidified with 14 ml. concentrated HCl and 12.5 ml. of glacial acetic acid in 200 ml. of water and agitated for 1½ hours at 25° C. After additional water washes, the polymer was isolated by coagulation in isopropanol, recovered and dried in a vacuum oven at 110° C. for 48 hours. The dried polymer had a reduced viscosity (0.2 gram sample in 100 ml. methylene chloride solution at 250° C.) of 0.63.

EXAMPLE 2

*Preparation of Polycarbonate Homopolymers*

The procedure described in Example 1 was repeated twice using the same apparatus and formulation except that the quantity of p-phenyl phenol terminator employed was increased in each case. The resultant polymers were found to have reduced viscosity values of 0.41 and 0.5 respectively.

EXAMPLE 3

*Preparation of Polycarbonate Homopolymer by Ester Interchange*

To a three liter glass reactor equipped with a stirrer, thermometer, and Vigreux column was charged:

| | Gms. |
|---|---|
| 4,4′dihydroxy-2,2- dihpenyl propane (Bisphenol A) | 684 |
| Diphenyl carbonate | 675 |
| Lithium hydroxide in phenol (0.5% LiOH·H₂O) | 0.3 |

This reaction was heated and by-product phenol distilled off over a period of 3½ hours. The temperature and pressure at the start were 120° C./40 min. These conditions were gradually made more severe until a final temperature of 248° C. at 10 min. was obtained. The reduced viscosity of the product was 0.20 (0.2 gram in 100 ml. solution in CH₂Cl₂ at 25° C.).

EXAMPLE 4

(A) *High Molecular Weight Bisphenol-A-Isophthalate Copolyester (10% Isophthalate)*

To a two liter closed glass reactor provided with a sealed stirrer, pH meter electrodes, thermometer, a reflux condenser, and three inlet tubes, were charged 125.0 grams (0.55 mole) of 2,2-(4,4′-dihydroxy-diphenyl)propane, 0.11 gram of sodium hydrosulfite (antioxidant), 2.12 grams of p-phenylphenol, and 181 grams of water. To this mixture, 11.0 grams of sodium hydroxide dissolved in 330 grams of water (25 per cent of the stoichiometric amount of sodium hydroxide) was added slowly with constant stirring. The temperature of the system was established at about 25° C. and 530 grams of methylene chloride and 1.67 grams of triethylamine were added. At this point the pH of the mixture was 11.2. With continued vigorous stirring phosgene gas was bubbled into the reactor, and simultaneously the dropwise addition of solutions containing 46.2 grams (1.16 moles, 105 percent of the stoichiometric amount) of sodium hydroxide in 80 grams of water and 11.15 grams (0.055 mole) of isophthaloyl chloride in 30 grams of methylene chloride was begun. Phosgene was added at a rate of approximately one gram per minute. The isophthaloyl chloride-methylene chloride solution was also added at a rate of approximately one gram per minute. The sodium hydroxide solution was added at such a rate so that the pH of the reaction mixture was maintained within the range of 10.8 to 11.3. After the addition of the sodium hydroxide solution was complete, phosgene addition was continued until the pH of the reaction mass had dropped to 7.0. At this point, 30 grams of sodium hydroxide dissolved in 60 grams of water was added and the resulting mixture stirred for 10 minutes. Throughout the entire phosgenation reaction period of 1 hour, 11 min., the temperature of the system was maintained at 25° C.±3. Upon settling, an equeous layer developed which was drawn off. The polymer solution was washed several times with water and then neutralized with a mixture of dilute (ca. 1 percent) hydrochloric and acetic acids. Washing was continued until the aqueous extracts tested negative for chloride ion with silver nitrate. The polymer was then coagulated by vigorous stirring with about 1,200 ml. of isopropanol, filtered and dried. The final copolyester resin had a reduced viscosity (0.2 gram polymer/ 100 ml. methylene chloride at 25° C.) of 0.80.

(B) *Bisphenol-A-Carbonate Diphenate Copolyester*

The procedure given in Example 4 (A) was repeated using 15.35 grams (0.055 mole) diphenoyl chloride

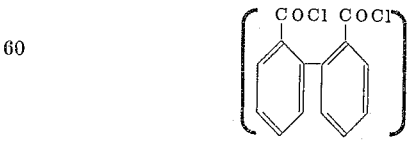

dissolved in 40 ml. methylene chloride solution in place of the isophthaloyl chloride solution. The isolated polymer had a reduced viscosity of 0.48.

EXAMPLES 5–9

In each of these examples a 40 pound sample of a polycarbonate produced by the method of Example 4(A) was initially admixed with a quantity of organic dye and thereafter charged to a twin-screw compounding extruder to achieve uniform dispersion of the dye in the resin. The extruded material was granulated, dried and injection molded at a temperature of 650° F. The pertinent data is set forth in Table I below.

TABLE I

| Example | Organic dye | Dye conc., percent by weight | Color |
|---|---|---|---|
| 5 | 1-methylamino anthraquinone | 0.15 | Red. |
| 6 | 1-butylamino anthraquinone | 0.10 | Do. |
| 7 | 1-hydroxy-4-ethylamino anthraquinone. | 0.05 | Pink. |
| 8 | 1,4-di(p-toluidino) anthraquinone. | 0.20 | Green. |

Comparison plaques of each of the formulations of Examples 5–9 were pressure molded at 500° F. The appearance of the plaques and the injection molded articles were identical and were each of a strong, bright, uniform color. No fading was evident. In contrast, an injection molded article formed by injection molding a composition of the same polycarbonate with 0.05% 1,4-diethylamino anthraquinone under the same conditions was a non-uniform and unacceptably faded blue color.

EXAMPLE 10

A six pound sample of the polycarbonate employed in Examples 5–9 was fluxed on a two-roll mill, admixed with 1,5-di(p-toluidino) anthraquinone to form a composition containing 0.025% by weight of the colorant, sheeted off, granulated, dried and injection molded at 650° F. The injection molded article exhibited a strong, bright, uniform violet color with no fading apparent. A similar plaque molded at 500° F. was identical in color and general appearance. By contrast composition samples of the same resin containing 0.01% and 0.25% by weight of 1 methylamino, 4-(p-toluidino) anthraquinone and 1,4 dihydroxy anthraquinone respectively compounded in the same manner and molded at 650° F. produced a badly faded blue product and a discolored product darkening from orange to brown respectively.

The colored compositions of the present invention are useful in all applications where polycarbonate resins are suitable and particularly where esthetic appeal is an important consideration. Such uses include decorative handles and knobs on household appliances and kitchen utensils, shower curtains, waste baskets, buttons for wearing apparel, toys, and the like.

What is claimed is:

1. A colored thermoplastic composition possessing color stability at elevated temperatures which comprises a normally solid polycarbonate resin and at least one organic dye selected from the group consisting of 1-methylamino anthraquinone; 1-butylamino anthraquinone; 1,4-di(p-toluidino) anthraquinone; 1,5-di(p-toluidino) anthraquinone and 1-hydroxy, 4-ethylamino anthraquinone, said organic dye being present in an amount sufficient to impart color to said composition.

2. The composition according to claim 1 wherein the polycarbonate resin is a normally solid gem-bis(hydroxyphenyl) alkane carbonate homopolymer.

3. The composition according to claim 2 wherein the polycarbonate resin is a 2,2-(4,4'-dihydroxy-diphenyl) propane carbonate homopolymer.

4. The composition according to claim 1 wherein the content of organic dye is from about 0.00001 percent to about 1.0 percent by weight based on the weight of the polycarbonate resin.

5. The composition according to claim 4 wherein the organic dye is 1-methylamino anthraquinone.

6. The composition according to claim 4 wherein the organic dye is 1-butylamino anthraquinone.

7. The composition according to claim 4 wherein the organic dye is 1,4-di(p-toluidino) anthraquinone.

8. The composition according to claim 4 wherein the organic dye is 1,5-di(p-toluidino) anthraquinone.

9. The composition according to claim 4 wherein the organic dye is 1-hydroxy, 4-ethylamino anthraquinone.

References Cited in the file of this patent

UNITED STATES PATENTS

| 1,828,588 | Bally et al. | Oct. 20, 1931 |
| 2,051,004 | Koeberle et al. | Aug. 11, 1936 |
| 2,152,191 | Herrett | Mar. 28, 1939 |
| 2,571,319 | Waters et al. | Oct. 16, 1951 |
| 2,848,462 | Gutzwiller et al. | Aug. 19, 1960 |
| 2,950,266 | Goldblum | Aug. 23, 1960 |
| 3,022,171 | Ossenbrumer et al. | Feb. 20, 1962 |

FOREIGN PATENTS

| 772,627 | Great Britain | Apr. 17, 1957 |

OTHER REFERENCES

Color Index, 2nd Edition (1956), vol. 2, published by American Association of Textile Chemists and Colorists, Lowell, Mass., pp. 3469–3470 and 3489–3499.